United States Patent
Fargier

(10) Patent No.: US 11,528,159 B2
(45) Date of Patent: Dec. 13, 2022

(54) METHOD OF AUTOMATIC CONFIGURATION OF NETWORK ADDRESS OF A COMMUNICATING ELEMENT FORMING PART OF A HOME-AUTOMATION SYSTEM, ASSOCIATED NETWORK INTERFACE, COMMUNICATING ELEMENT AND HOME-AUTOMATION SYSTEM

(71) Applicant: SOMFY ACTIVITES SA, Cluses (FR)

(72) Inventor: Sylvain Fargier, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/643,972

(22) PCT Filed: Sep. 3, 2018

(86) PCT No.: PCT/EP2018/073613
§ 371 (c)(1),
(2) Date: Mar. 3, 2020

(87) PCT Pub. No.: WO2019/043224
PCT Pub. Date: Mar. 7, 2019

(65) Prior Publication Data
US 2021/0067364 A1 Mar. 4, 2021

(30) Foreign Application Priority Data
Sep. 4, 2017 (FR) ........................... 1758144

(51) Int. Cl.
*H04L 12/28* (2006.01)
*H04L 41/0803* (2022.01)
*H04L 61/4511* (2022.01)

(52) U.S. Cl.
CPC ...... *H04L 12/2807* (2013.01); *H04L 41/0803* (2013.01); *H04L 61/4511* (2022.05)

(58) Field of Classification Search
CPC ............ H04L 12/2807; H04L 41/0803; H04L 61/1511
See application file for complete search history.

(56) References Cited

U.S. PATENT DOCUMENTS 10,091,100 B1 * 10/2018 Duerk .................. H04L 47/125
10,911,918 B2 * 2/2021 Xia ..................... H04L 12/2807
(Continued)

FOREIGN PATENT DOCUMENTS

| EP | 2003859 A1 | 12/2008 | |
| EP | 2469802 A1 | 6/2012 | |
| WO | WO-2013123763 A1 * | 8/2013 | ......... H04L 61/2015 |

OTHER PUBLICATIONS

International Search Report, dated Oct. 30, 2018, from corresponding PCT application No. PCT/EP2018/073613.
(Continued)

*Primary Examiner* — Jerry B Dennison
(74) *Attorney, Agent, or Firm* — Nixon & Vanderhye

(57) ABSTRACT

Disclosed is a method for automatically configuring a network address of network interfaces of communicating elements intended to form part of a home-automation system for a building and belonging to an unconfigured network part, the unconfigured network part including a head network equipment item and at least one communicating element, the network address of each network interface including a network prefix. The method is implemented subsequent to the connection of the head network equipment item to a configured communication network arranged in the form of a hierarchical network including at least two successive hierarchy levels, the method including steps of: negotiating the network prefix of the network interface of the head network equipment item; propagating the network prefix to the communicating elements belonging to the
(Continued)

network part with a view to the automatic configuration of the network addresses of the set of network interfaces of the communicating elements.

21 Claims, 5 Drawing Sheets

(56) References Cited

U.S. PATENT DOCUMENTS

| | | | | |
|---|---|---|---|---|
| 2003/0115298 A1* | 6/2003 | Baker | ............... | H04L 29/12009 709/220 |
| 2003/0120766 A1* | 6/2003 | Ishiyama | ............ | H04L 12/2856 709/223 |
| 2004/0083306 A1* | 4/2004 | Gloe | ................ | H04L 29/12066 709/245 |
| 2004/0133689 A1* | 7/2004 | Vasisht | ............... | H04L 61/2061 709/228 |
| 2005/0047352 A1* | 3/2005 | Burdin | .................... | H04L 61/00 370/254 |
| 2005/0174998 A1* | 8/2005 | Vesterinen | .......... | H04L 61/6004 370/354 |
| 2006/0250982 A1* | 11/2006 | Yuan | ................. | H04L 29/12113 370/254 |
| 2009/0040987 A1* | 2/2009 | Hirano | ................ | H04L 29/1232 370/338 |
| 2009/0144419 A1* | 6/2009 | Riordan | ............ | H04L 29/12066 709/224 |
| 2010/0071053 A1* | 3/2010 | Ansari | ............. | G08B 13/19656 726/12 |
| 2010/0217837 A1* | 8/2010 | Ansari | .................... | H04L 41/12 709/218 |
| 2012/0082308 A1* | 4/2012 | Chamberlain | ...... | H04L 12/2805 380/44 |
| 2012/0191825 A1* | 7/2012 | Dai | ..................... | H04L 61/6068 709/220 |
| 2014/0095733 A1* | 4/2014 | Liu | ..................... | H04L 41/0806 709/245 |
| 2014/0153489 A1* | 6/2014 | Perras | .................. | H04W 60/00 370/328 |
| 2014/0169218 A1* | 6/2014 | Heintz | ................ | H04L 12/2834 370/254 |
| 2016/0150057 A1* | 5/2016 | Men | ....................... | H04W 4/70 709/230 |
| 2017/0006034 A1* | 1/2017 | Link, II | ............. | H04L 61/2514 |
| 2017/0126577 A1* | 5/2017 | Sender | .................... | H04W 4/02 |
| 2017/0359417 A1* | 12/2017 | Chen | ...................... | G06Q 30/01 |
| 2018/0242154 A1* | 8/2018 | Ballard | ................. | H04W 4/023 |
| 2019/0020494 A1* | 1/2019 | Roosli | ................. | H04L 12/2816 |
| 2019/0020718 A1* | 1/2019 | Mathews | .............. | H04L 67/125 |

OTHER PUBLICATIONS

French Search Report, dated Apr. 23, 2018, from corresponding French application No. 1758144.

Liu; EPP-IP: A Flexible and Automatic IP Address Registration Mechanism; 2012 Fourth International Conference on Ubiquitous and Future Networks (ICUFN); Jul. 4, 2012; pp. 515-519.

* cited by examiner

METHOD OF AUTOMATIC CONFIGURATION OF NETWORK ADDRESS OF A COMMUNICATING ELEMENT FORMING PART OF A HOME-AUTOMATION SYSTEM, ASSOCIATED NETWORK INTERFACE, COMMUNICATING ELEMENT AND HOME-AUTOMATION SYSTEM

BACKGROUND OF THE INVENTION

Field of the Invention

The present invention relates to a method for automatically configuring a network address of a communicating element forming part of a home automation system for a building, each communicating element being connected in a hierarchical communication network, and an associated network interface, communicating element and home automation system for a building.

The invention falls within the field of home automation for buildings for commercial, industrial or residential use, whether they are individual or collective.

Description of the Related Art

Many buildings exist that are provided with controllable electrical equipment seeking to perform comfort and energy management functions, such as heating, ventilation and air conditioning, but also management of the light and control of the opening frames, such as shutters or rolling blinds placed in front of the windows of the building or remote securing by controlling closing systems (doors, locks) or monitoring systems. The automatic operations are the sets of rules that govern the control of the electrical equipment by a programmable supervision system, in order to ensure better comfort of the occupants of the building or to optimize energy consumption. These automatic operations are referred to as "Building Automation Systems". In the residential sector, the building automation systems are more often referred to as "home automation".

Hereinafter, the term "home automation" will be used to refer, generally, to techniques in building automation systems, computing and telecommunications in order to supervise all of the pieces of equipment that are installed in a building for commercial, industrial and residential use.

Typically, the equipment items in a same building are connected to a control unit, which serves to supervise these equipment items and control the operation thereof. This connection is often made by connecting the equipment items, by wired connections, to a shared data bus, such as a multipoint bus authorizing a two-way connection, for example of type RS485. This data bus is coupled to the control unit, so as to form a network that authorizes the exchange of data among the equipment items and the control unit.

However, such a situation has drawbacks.

On the one hand, it offers limited flexibility, since any modification after installation requires recabling the network, whether by adding new equipment items or in order to modify their distribution in the building. This requires carrying out work that may be lengthy and expensive, and which requires the participation of specialized technicians.

Furthermore, this known situation has limitations in terms of the number of equipment items that can be received on the network. For example, the solutions of type RS485 currently used have limited addressing capabilities, for example making it possible to connect a maximum of 255 equipment items on a same box. This limit is prohibitive when it involves equipping large buildings and/or buildings including a large number of equipment items to be managed. Yet modern applications make it necessary to be able to manage a large number of equipment items, for example in the context of the Internet of things.

Furthermore, the architecture of these known networks can lead to the appearance of high lag times during the communication between an equipment item and the control unit. This in particular can be explained by the fact that the control is centralized and the information emitted by the equipment items must escalate toward the bus to be processed by the control unit. Yet for certain applications, too great a lag time can be detrimental to the proper working of the equipment.

To address these drawbacks, it is proposed to improve the home automation system by adding a hierarchical communication network architecture, making it possible to manage a large number of equipment items, each equipment item being a communicating element of the home automation system, while having an increased installation and evolution flexibility.

In such a hierarchical architecture, the communicating elements of the home automation system become nodes of the network, each having at least one network address allowing the communication of these communicating elements with one another in the hierarchical network. The system includes a main network of higher hierarchical level, and subnetworks of lower hierarchical levels than that of the main network, connected by network equipment items, gateways or routers.

In conventional communication networks, the configuration of the network addresses of the routers is done by intervention of an operator.

SUMMARY OF THE INVENTION

The invention aims to address this drawback, and to facilitate the installation and update of home automation systems without operator intervention.

To that end, the invention relates to a method for automatically configuring a network address of network interfaces of communicating elements which are intended to form part of a home automation system for a building and belonging to an unconfigured network part, the unconfigured network part including a head network equipment item and at least one communicating element, the network address of each network interface including a network prefix. The method is implemented subsequent to the connection of the head network equipment item to a configured communication network belonging to the home automation system for a building, the communication network being arranged in the form of a hierarchical network including at least two successive hierarchy levels, the method comprising the steps of:

negotiating the network prefix of the network interface of the head network equipment item,
  propagating said network prefix to the communicating elements belonging to the network part with a view to the automatic configuration of the network addresses of the set of network interfaces of said communicating elements.

Advantageously, the invention allows an automatic configuration of the network addresses in the communication network.

The method for automatically configuring a network address according to the invention may also have one or more of the following features, considered independently or according to any technically possible combinations.

The network address of each network interface includes a plurality of address fields, each of the address fields of the network address of a network interface relating to at least one hierarchy level of the communication network, and the negotiating step comprises the steps of:
 generating a first identifier,
 forming a network prefix by assigning the first identifier to a first address field of the network address,
 verifying uniqueness, in the configured communication network, of said network prefix formed with the first generated identifier,
 and in case of negative verification, repeating the steps for generating a first identifier, forming a network prefix and verifying uniqueness of the network prefix.

When the communication network includes a main network, the head network equipment item being connected to the main network, the negotiating step comprises a step for obtaining a second identifier associated with the main network and assigning the second identifier to a second address field of the network address.

When the communication network includes a main network and at least one subnetwork connected to the main network by means of a network equipment item and the head network equipment item is connected to said subnetwork, the negotiating step comprises a step for obtaining a second identifier associated with the subnetwork and assigning the second identifier to a second address field of the network address.

When the communication network includes a main network, at least one subnetwork connected to the main network by means of a first network equipment item and at least one sub-subnetwork connected to the subnetwork by means of a second network equipment item, and the head network equipment item is connected to one said sub-subnetwork, the negotiating step comprises a step for obtaining a second identifier associated with the sub-subnetwork and assigning the second identifier to a second addressing field of the network address.

When an interface identifier has been assigned to the network interface of the head network equipment item, the network address configuration method of the head network equipment item further comprises a step for assigning the interface identifier of the network interface of the head equipment item to a third address field of the network address.

The propagation step of the network prefix comprises the sending, by the network interface of the head network equipment item and to at least one first network equipment item directly connected to the head network equipment item, of the network prefix of the network address of the network interface of the head network equipment item, and the method comprises the steps of:
 negotiating a network prefix of the network interface of the first network equipment item from the network prefix received from the head network equipment item,
 advertising the network prefix of the network interface of the first network equipment item, to communicating elements directly connected to the first network equipment item,
 if the recipient communicating element is a network equipment item, the steps for negotiating and advertising are repeated in a cascade for each network equipment item of successive hierarchy level, in a descending order.

The network prefix of the network interface of the head network equipment item is transmitted in a broadcast message, and the negotiation of a network prefix of the network interface of the first network equipment item comprises steps for:
 receiving the network prefix of the head network equipment item by the network interface of the first network equipment item,
 generating the network prefix of the network interface of the first network equipment item from the received network prefix.

The step for negotiating the network prefix further comprises steps for:
 generating an identifier associated with a sub-subnetwork,
 verifying the uniqueness, in the communication network, of the network prefix formed with the received network prefix and the generated identifier,
 in case of negative verification, the identifier generating and verification steps being repeated.

The propagation step of the network prefix comprises the emission of a broadcast message by the network interface of the network equipment item to at least one home automation equipment item directly connected to the network equipment item, an interface identifier having been assigned to the network interface of the home automation equipment item, the broadcast message including the network prefix of the head network equipment item,
 the method comprising steps for:
 reception of the network prefix by the network interface of the home automation equipment item,
 extraction of address fields of the network prefix,
 assignment of a network address to the network interface of the home automation equipment item from extracted address fields and the interface identifier of the home automation equipment item.

According to another aspect, the invention relates to a network interface for a communicating element belonging to a home automation system for a building including a network controller configured to carry out the method for automatically configuring a network address as briefly described above.

According to another aspect, the invention relates to a communicating element belonging to a home automation system for a building including a network interface as briefly described above.

According to another aspect, the invention relates to a home automation system for a building including a communication network arranged in the form of a hierarchical network and a plurality of communicating equipment items as briefly described above connected to the communication network.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF THE PREFERRED EMBODIMENT

Figure 1:
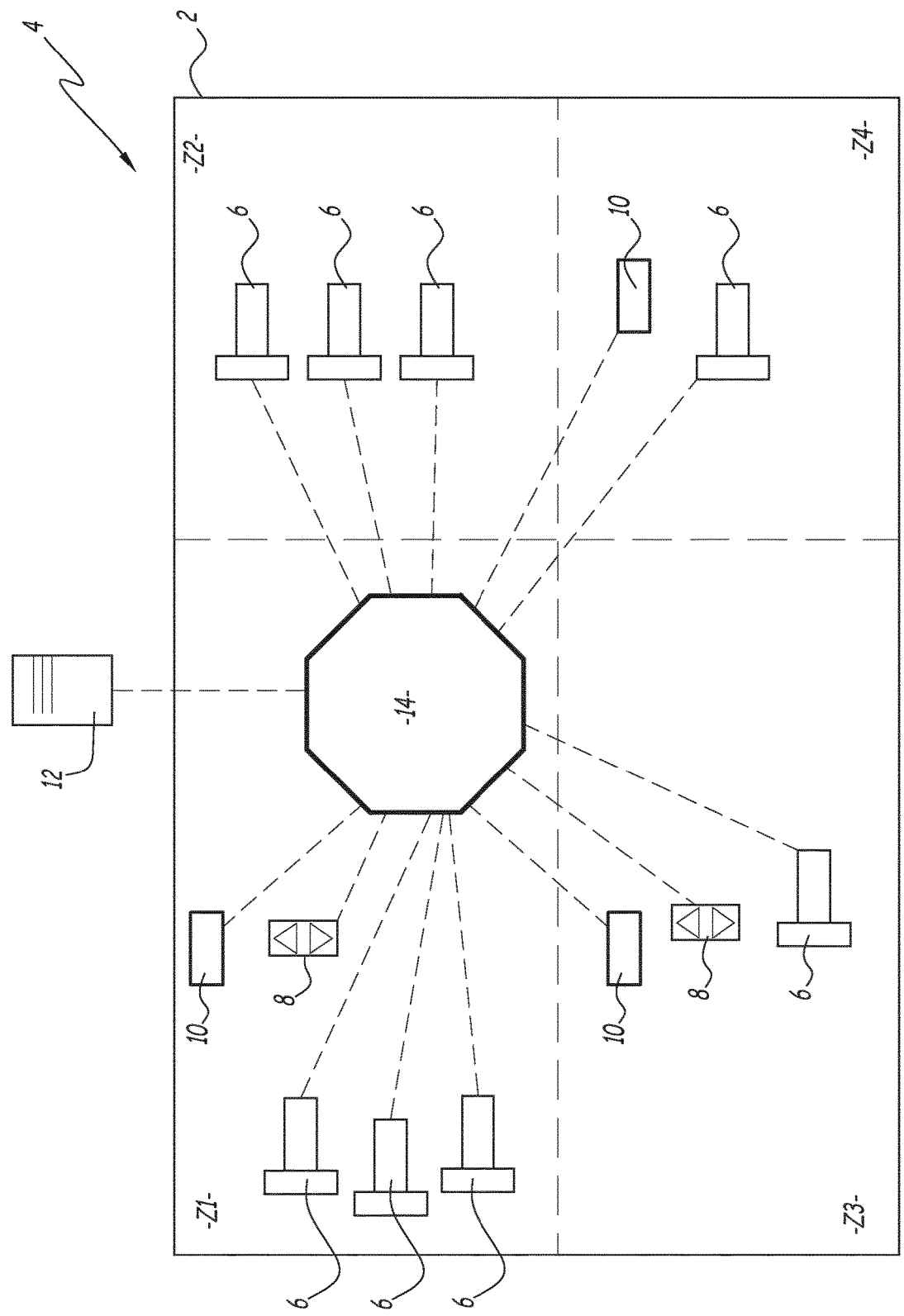
FIG. 1 is a schematic illustration of a building including a home automation system according to the invention.

FIG. 1 shows a building 2, including several zones Z1, Z2, Z3, Z4. The building 2 is equipped with a home automation system 4 that includes a set of home automation equipment items distributed in the zones of the building 2, as well as a control system for these home automation equipment items.

The home automation system 4 here is intended to procure comfort and/or energy management functions of the building 2, such as the heating, ventilation and air conditioning, as well as management functions for the lighting, control of the opening frames, such as shutters or rolling blinds placed in front of windows of the building 2 and/or security functions such as monitoring of the premises and the alarm.

The set of home automation equipment items includes home automation equipment items such as controllable home automation apparatuses 6, control points 8 and sensors 10.

The control system in particular includes a programmable control unit 12 and a communication network 14, inside the building 2, the communication network 14 being arranged to allow the communication of the home automation equipment items of the home automation system 4 with the control unit 12. The home automation equipment items of the home automation system 4 that are connected to this communication network 14 are said, hereinafter, to belong to the communication network 14.

The home automation equipment items and the control system here are connected to one or several electric power sources, not illustrated, of the building 2.

The zones of the building 2 correspond to spatial portions of the building 2 that are located inside and/or outside this building and that are intended each to receive part of the home automation equipment items of the home automation system 4.

For example, zones of the building 2 correspond to levels of the building 2, such as floors or basements. These zones can also be rooms, groups of rooms of the building 2, optionally separated from one another by partitions, these rooms being able to be distributed within one or several levels of the building 2. These zones can also correspond to façades or façade portions, such a façade portion corresponding to a same floor.

These zones are for example defined during the design of the building 2 and/or during the design and/or the installation of the home automation system 4.

Preferably, the zones of the building 2 are separate from one another. However, in a variant, zones of the building 2 can intersect and/or be interleaved with one another.

The building 2 can be a set of offices, or a building for residential use, or a building for commercial or industrial use, or any combination of these uses. It can in particular be a multi-unit building or an individual house.

Thus, within the meaning of the present disclosure, the term "home automation" is not limited to purely domestic and residential use.

In this example, only four zones, here denoted Z1, Z2, Z3 and Z4, are defined in reference to the building 2. However, in practice, this number can be different. It is in particular adapted as a function of the configuration of the building 2 and functions of the home automation system 4.

To simplify FIG. 1, the zones Z1, Z2, Z3 and Z4 are illustrated schematically inside a same floor of the building 2.

Preferably, each controllable home automation apparatus 6 includes an actuator controllable using at least one control signal.

The controllable home automation apparatuses 6 here are illustrated identically. However, they can have differences relative to one another and perform different functions within the home automation system 4.

For example, the actuator of the controllable home automation apparatus 6 includes an electric motor coupled with a mechanical load and arranged to move and/or adjust an element of the building 2.

According to one example, the mechanical load of the controllable home automation apparatus 6 is a concealing blind, such as a panel, a shutter or an opaque curtain, associated with at least one opening of the building 2, such as a window or a bay window. The movement of this concealing blind makes it possible to regulate the quantity of sunshine received by the building 2 through this opening.

According to another example, the mechanical load of the controllable home automation apparatus 6 is a compressor configured to carry out an expansion-compression cycle of a heat transfer fluid within a refrigeration system of the building 2, such as an air conditioner or a heat pump, in order to regulate the temperature inside the building 2.

According to still another example, the mechanical load of the controllable home automation apparatus 6 is a pump or a fan intended to set a volume of fluid in motion within the building 2, for example to suction or blow air within a ventilation system, or to circulate water or a heat transfer fluid within a dedicated duct.

In a variant, the actuator of the controllable home automation apparatus 6 can control an electric switching device, in order to control the illumination and extinction of a light source, such as a neon or light-emitting diode light battery, within the building 2.

The controllable home automation apparatus 6 can also be a light, for example an inside light, outside light, or a lighting control system, an alarm system, or a video camera, in particular a video surveillance camera.

Each control point 8 is intended to receive control instructions from a user of the building 2, in order to control, directly or indirectly, one or several of the controllable home automation apparatuses 6 and/or to control the control unit 12.

To that end, each control point 8 here controls a man-machine interface, not illustrated, including data entry means, such as one or several switches and/or one or several pushbuttons and/or one or several rotary buttons and/or a touchscreen. The control point 8 can also include a connection interface for connecting external control means, for example one or several individual switches positioned around the control point 8 and connected to the latter by a wired link.

The control points 8 can assume the form of a portable remote control associated with a fixed receiver or, in a variant, a fixed control terminal secured to a wall of the building 2.

Each sensor 10 is intended to convert one or several physical properties relative to the state of the building 2 or its environment into one or several signals proportional to this physical property. This signal is for example an electric signal, a light signal or a radiofrequency signal. This signal can be transmitted by the sensor to at least one home automation equipment item and/or control system, for example, the control unit 12.

One or several sensors 10 can be integrated into a controllable home automation apparatus 6, a control point 8 or the control unit 12. The home automation installation 4 can include one or several independent sensors.

For example, the physical properties measured by the sensors 10 are, non-limitingly, a temperature, for example a temperature of a wall or the ambient air, a humidity level, a brightness value, a pressure value of the ambient air, a consumption value for example of water, gas or electricity, the opening state of a rolling shutter, the position of an opening frame such as a window, which may or may not be motorized, or the presence or absence of a user.

As an illustrative example, in FIG. 1, the zone Z1 includes three controllable home automation apparatuses 6, a control point 8 and a sensor 10. The zone Z2 includes three controllable home automation apparatuses 6. The zone Z3 includes a controllable home automation apparatus 6, a control point 8 and a sensor 10. The zone Z4 includes a controllable home automation apparatus 6 and a sensor 10.

Each home automation equipment item of the home automation system 4, in particular including the controllable home automation apparatuses 6, the control points 8 and the sensors 10, is connected to the control unit 12 via the communication network 14 and to that end includes a network interface 40 for connecting to this communication network 14. The control unit 12 also includes a network interface 40.

For example, each controllable home automation apparatus 6 receives control signals by means of the communication network 14. Each control point 8 transmits the control instructions received by means of the communication network 14. Each sensor 10 sends the measured information by means of the communication network 14.

The communication is done according to a given communication protocol.

For example, the communication is done by an exchange of messages, for example in the form of packets, these messages each containing a header, which includes a destination of the message, and useful data, such as a command order or a physical property value measured by a sensor.

Preferably, the communication protocol used is an IP protocol (Internet Protocol), for example the IPv6 protocol. In a variant, the communication protocol is the IPv4 protocol.

Figure 2:
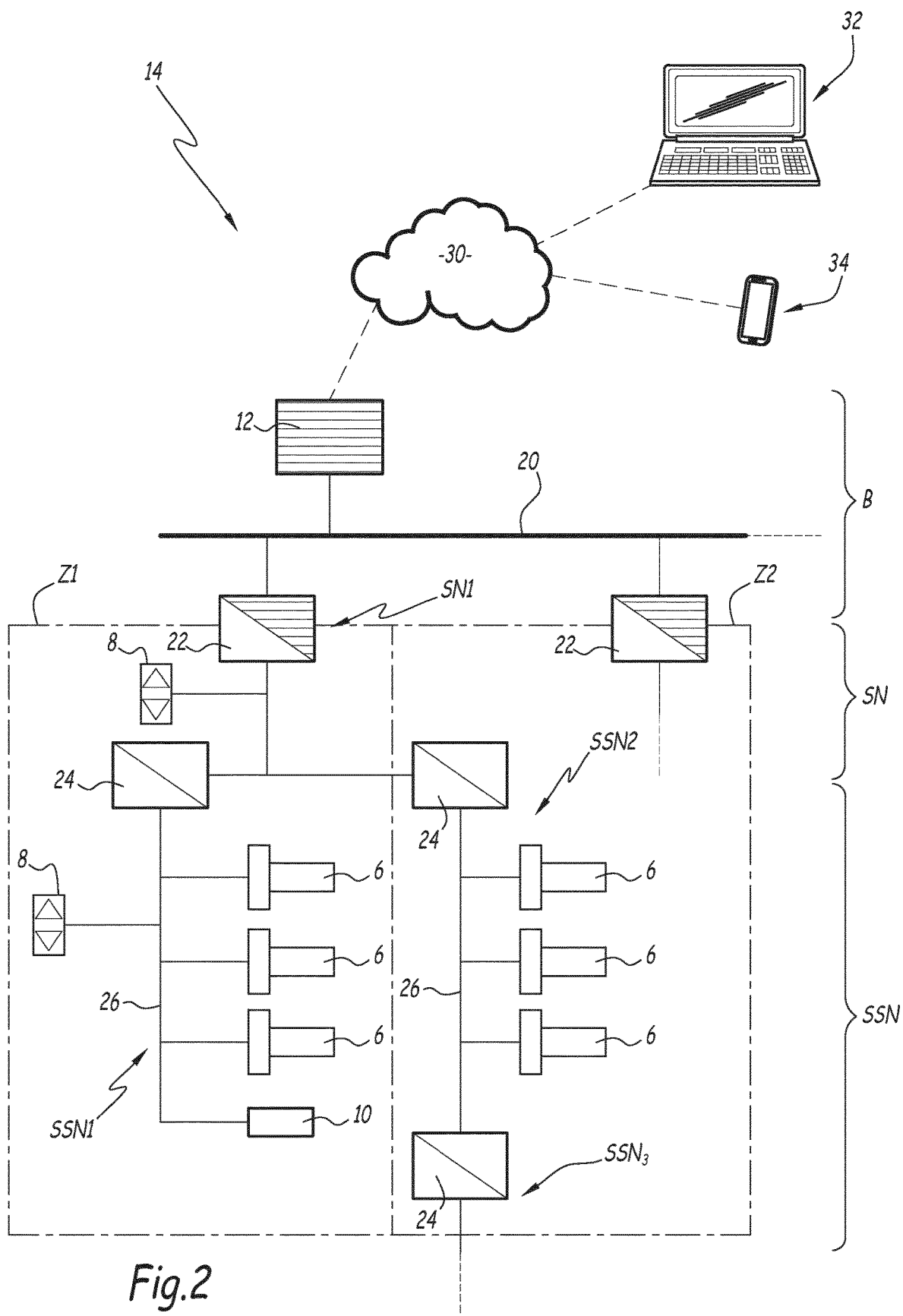
FIG. 2 is a schematic illustration of a hierarchical communication network for connecting the equipment items of a home automation system in one embodiment.

FIG. 2 shows the example of the communication network 14 of FIG. 1 in more detail. To facilitate the reading of this FIG. 2, the home automation equipment items 6, 8, 10 associated with the zones Z3 and Z4 of the building 2 are not illustrated.

The communication network 14 is a hierarchical network with several hierarchy levels, also called ranks. It includes a main network B which in particular includes a common data bus, forming a backbone 20, to which the control unit 12 is connected.

For example, the backbone 20 is a cabled link of the Ethernet type (standard IEEE 802.3), for example Ethernet 100 Mbit/s or greater.

The communication network 14 also includes at least one subnetwork, generically denoted by reference SN. This subnetwork includes a network equipment item 22, 24, which is directly connected to the backbone 20 by means of a network interface 40 and which forms the head of this subnetwork SN.

It may be an interconnected network equipment item, also called gateway 22, intended to interconnect two separate network portions, for example, with different technologies. It may also be a router 24 when the main network B and the subnetwork SN are of the same nature.

The term router refers to a hardware and software tool forming an intermediate element in a network and steering data, for example in the form of data packets, between one and several parts of the network. The direction given to the data, or routing, is done according to a set of rules forming a routing table.

The term gateway designates a specific router, which also performs, in addition to routing functions, a function of translating messages circulating on the network, inasmuch as the physical means and/or protocols differ between two network portions.

In other words, the role of the router and gateway network equipment items is to cause packets to pass from one network interface 40 to another according to a set of rules forming a routing table.

In the example of FIG. 2, two gateways 22 are connected to the backbone 20, thus forming two separate subnetworks SN1 and SN2. Only one of these two subnetworks, bearing reference SN1, is described hereinafter.

In a variant, the number of subnetworks SN can be different.

The subnetworks SN are directly connected to the main network by means of gateways, and have an associated first rank in the hierarchical network.

Each subnetwork SN contains at least one home automation equipment item 6, 8, 10 of the home automation system 4, connected to the corresponding gateway 22 by means of a physical link 26, preferably cabled.

The communication network 14 further includes sub-subnetworks of rank lower than that of the subnetworks SN, and are generically denoted by the reference SSN.

Each sub-subnetwork SSN includes a network equipment item, advantageously a router 24, connecting it to a subnetwork SN or to a sub-subnetwork with a hierarchical level higher than its own. The network equipment item 22, 24 forms the head of this sub-subnetwork SSN. It is also called head network equipment item.

In reference to the example of FIG. 2, if a rank "n" is associated with the subnetwork SN1, each sub-subnetwork SSN1 and SSN2 has an associated rank "n−1", and the sub-subnetwork SSN3 has a rank "n−2".

Each sub-subnetwork head router 24 with rank "n−1" is connected to a gateway 22 by means of a physical link 26, which is preferably cabled.

When the communication network 14 includes several hierarchical levels, each sub-subnetwork network head equipment item 22, 24 with rank "n−k", with k greater than or equal to 2, is connected to a router 24 of higher rank "n−k+1", by means of a physical link 26, which is preferably cabled.

In one embodiment, the hierarchical network can include up to twelve hierarchical levels, including that of the main network B.

Each sub-subnetwork SSN includes one or several home automation equipment items 6, 8, 10, connected to the corresponding router 24 by means of a physical link 26, each home automation equipment item being connected to the physical link 26 using its network interface 40. The home automation equipment items connected, via a same physical link 26, to a same router 24 here are said to be part of a same local subnetwork.

Preferably, the subnetwork SN and each sub-subnetwork SSN of rank lower than that of the subnetwork SN are each associated with a zone of the building 2.

A subnetwork SN and/or a sub-subnetwork SSN is said to be "associated" with a zone Z1, Z2, Z3, Z4 of the building 2 when the home automation equipment items 6, 8, 10 belonging to this subnetwork are in turn associated with this zone, for example because they are physically located inside this zone Z1, Z2, Z3, Z4 of the building 2.

The number and the structure of the subnetworks SN and sub-subnetworks SSN, as well as their association with the zones of the building 2, are preferably chosen as a function of the configuration of the building 2 and functionalities fulfilled by the home automation system 4.

Preferably, the physical link 26 that connects the network equipment items 22, 24 to one another and that connects them to the home automation equipment items 6, 8, 10 is a multipoint serial data bus of type RS485.

The use of a physical link 26 of type RS485 has advantages in this communication network 14, since it makes it possible to use long data buses, for example up to 1 km long, without overly deteriorating the quality of the signal circulating therein. The limitation of the number of home automation equipment items 6, 8, 10 and/or network equipment items 22, 24 connected on a same physical link 26 is not penalizing, owing to the hierarchical architecture that makes it possible to connect a large number of subnetworks.

In FIG. 2, the gateways 22 are interconnected network equipment items between an Ethernet data bus and a RS485 data bus.

Optionally, the control unit 12 is configured to be connected to an outside data network 30, such as the Internet, independently of the communication network 14.

In this way, the control unit 12 can communicate with a remote computer server connected to this outside network 30, for example to send reports on the operating state of the home automation system 4 for diagnostic purposes, or to receive control instructions. The control unit 12 can also communicate by the outside network 30 with one or several remote users, for example equipped with a communication terminal such as a computer 32, a smartphone apparatus, a touch-sensitive tablet or any other equivalent equipment item.

The communication network 14 is suitable for working according to a predefined communication protocol, such as the IP protocol, in order to provide communication between the communicating elements of the home automation system 4 that are connected to this communication network 14.

In the preferred embodiment, the communication protocol used is the IPv6 protocol.

This communication protocol here is implemented using network interfaces that equip the various home automation equipment items 6, 8, 10 and network equipment items 22, 24 of the home automation system 4 that are connected by the communication network 14, in particular owing to their network interface.

Hereinafter, the generic term "communicating element" will designate the network equipment items 22, 24 and the home automation equipment items 6, 8, 10.

The routers 24 and the gateway(s) 22 include specific network interfaces. For example, these network interfaces each implement a protocol stack, that is to say, a stack of layers of protocol, each protocol layer basing itself on those below it in order to provide additional functionality.

Figure 3:
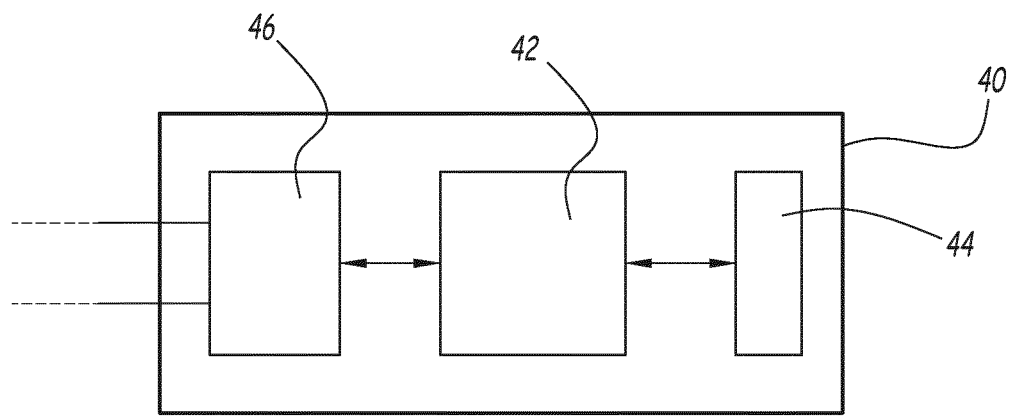
FIG. 3 is a schematic illustration of a network interface of a home automation equipment item belonging to the communication network of FIG. 2.

FIG. 3 schematically shows the network interface of a communicating element. The network interface of a communicating element serves to connect this communicating element to one or several communication networks. It thus allows it to communicate with the other communicating elements of the network(s) to which it is connected.

As illustrated in FIG. 3, each network interface 40 includes a network controller 42, a memory 44 and a transceiver 46, the transceiver 46 here being provided with a connector arranged to physically connect the transceiver 46 to a physical layer of the communication network 14.

In this example, the physical layer of the communication network 14 is partially formed by the physical links 26.

The network controller 42 includes an electronic computer, for example one or several processors, microprocessors or any other equivalent means, programmed to process data passing through the communication network 14 and the connector of the transceiver 46.

For example, the network controller 42 is programmed to automatically process the data received by the transceiver 46 and intended for the network interface 40. The processing can for example consist of extracting and decoding the content of packets received by the network interface and/or to transmit this content to the home automation equipment item with which it is associated.

In a complementary manner, the network controller 42 is programmed to automatically prepare the data emitted by the home automation equipment item with which it is associated, in order to send it to one or several home automation equipment items connected to the communication network 14.

Lastly, the network controller 42 is configured to implement program code instructions making it possible to execute steps of the method for configuring a network address according to the invention.

The memory 44 here contains a network address 50, a network address portion or at least one identifier, making it possible to uniquely identify the network interface 40 on the communication network 14 and which therefore identifies the corresponding home automation equipment item on the communication network 14. The network interface 40 here is compatible with the IPv6 standard, that is to say, able to implement the IPV6 network protocol.

Furthermore, the memory 44 advantageously contains program code instructions that are executable to ensure the operation previously described of the network controller 42.

Figure 4:
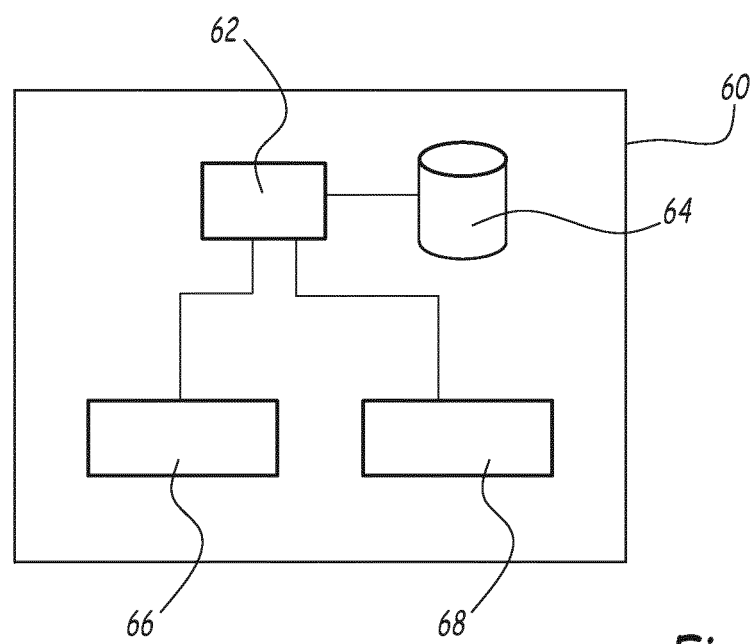
FIG. 4 is a schematic illustration of a network equipment item belonging to the communication network of FIG. 2.

FIG. 4 schematically shows a generic network equipment item 60 intended to be used in the communication network 14. The generic network equipment item 60 for example corresponds to a gateway 22 or a router 24.

This network equipment item 60 includes a programmable computing device 62, including one or several processors, a memory 64, a first network interface 66 and a second network interface 68. The first network interface 66 is for example intended to be connected to a first sub-subnetwork, while the second network interfaces 68 is intended to be connected to a second sub-subnetwork, of lower rank than the first sub-subnetwork. The first and second network interfaces 66, 68 are for example each physically similar to the interface 40 described in reference to FIG. 3.

Each network interface of the network equipment item 60 includes at least one network address 50 that will be described in more detail hereinafter.

The programmable device 62 is configured to implement program code instructions making it possible to execute steps of the method for configuring a network address according to the invention. These program code instructions can for example be stored in the memory 64 of the network equipment item.

The programmable device 62 is further programmed to ensure routing of the data packets arriving from the network portion associated with one or the other of the first and second network interfaces 66, 68 toward a portion of the communication network 14 connected to the other network interface 66, 68, as a function of the destination of these data packets. To that end, the equipment item 60 here includes a routing table, for example recorded within the memory 64. This routing table contains the list of all of the known routes of the communication network 14.

For example, if reference is made to the embodiment of FIG. 2, in the case of a router 24, the first and second network interfaces 66, 64 here are compatible with the data buses of type RS485.

A gateway 22 has an operation similar to that of the network equipment item 60 described above, except that one of the two network interfaces 66, 68 is connected with the backbone 20.

In a variant, a network equipment item 60 has a network interface 66 intended for an uplink with a network equipment item having a hierarchical level higher than that of the network equipment item 60, and several interfaces 68 intended for downlinks with network equipment items having a hierarchical level lower than that of the network equipment item 60.

The communication protocol used by the communication network 14 makes it possible to ensure the addressing of the messages exchanged between the elements of the home automation system 4.

For example, when a first communicating element of the home automation system 4, such as a control point 8, must send data to a second communicating element of the home automation system 4, such as a controllable home automation apparatus 6, then the first communicating element (called source) generates a message containing the data to be sent and containing the address of the second communicating element (called recipient). The message is thus routed within the communication network 14 of the source communicating element until reaching the recipient communicating element(s).

More specifically, a message exchanged between communicating elements of the network belonging to the same local subnetwork or the same local sub-subnetwork passes through the physical link 26 to which the communicating elements of the network are connected. A message exchanged between communicating elements of the network not belonging to the same local subnetwork or the same local sub-subnetwork is routed using the head router 24 of the local subnetwork to which the source communicating element is connected, which reorients it toward the subnetwork to which each recipient communicating element is connected, optionally by means of the network equipment items 22 and the backbone 20.

Each network equipment item 22, 24 and each communicating element 6, 8, 10 of the communication network 14 has at least one network interface 40 having a unique network address 50.

Subsequently, the network address 50 of the network interface 40 of a communicating element will be likened to the network address 50 of this communicating element.

Figure 5:
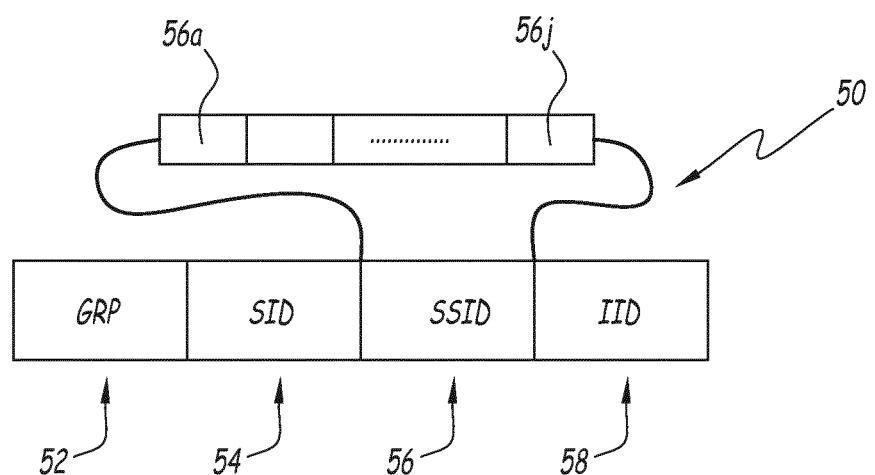
FIG. 5 is a schematic illustration of an exemplary network address structure for identifying the communicating elements of a hierarchical communication network.

FIG. 5 schematically shows an example of unicast addressing making it possible to define a communicating element uniquely.

The network address 50 includes several addressing fields respectively referenced 52, 54, 56 and 58, the addressing fields corresponding to different and successive hierarchical levels of the hierarchical communication network 14.

The address field referenced 52, associated with the highest hierarchical level of the communication network 14, contains a site prefix GRP (Global Routing Prefix), which identifies the communication network 14 as a whole. Typically, a unique site prefix GRP is assigned to the home automation system 4 of a building 2.

The site prefix GRP is preconfigured manually in all of the network equipment items 22, 24 intended to be connected on the backbone 20. It can be recorded in a memory 64 of the network equipment item 22, 24, for example, a memory 44 of its network interface 40. The site prefix GRP can only be modified manually. It corresponds to the highest hierarchical level in the communication network 14.

The address field referenced 54 contains a subnetwork identifier SID (Subnet IDentifier), which identifies the subnetwork SN with rank n, n being a non-nil integer, to which the considered communicating element belongs. Each subnetwork SN connected to the backbone 20 has a different corresponding subnet identifier SID.

The address field referenced 56 contains a sub-subnetwork identifier SSID (Sub Subnet IDentifier), which identifies the sub-subnetwork SSN with rank lower than n to which the considered communicating element belongs.

Lastly, the address field 58 contains an interface identifier IID (Interface IDentifier) corresponding to the unique identifier of the network interface 40 of the considered communicating element. In one embodiment, this is the MAC address that uniquely identifies each network interface 40 of a communicating element. This identifier is assigned to the network interface 40 during its manufacture. It can for example be stored in a memory 44 of the network interface 40. According to another embodiment, the address field 58 corresponding to the interface identifier IID can be entered during the manufacture of the network interface.

The network address 50 is made up of a network prefix, including the site prefix GRP, the subnet identifier SID and the sub-subnet identifier SSID, and the machine address including the interface identifier IID.

When the communication protocol used is the IPv6 protocol, the network address 50 of a communicating element 6, 8, 10, 22, 24 includes 128 bits in all, or 16 bytes. For example, the number of bytes allocated to each of the address fields 52, 54, 56 and 58 is respectively 48 bits, 16 bits, 40 bits and 24 bits. Additionally, the address field 56 corresponding to the sub-subnetworks is typically divided into address subfields 56a to 56j, making it possible to identify several layers of sub-subnetworks. Each address subfield corresponds to a different hierarchy level of the sub-subnetwork SSN. According to one embodiment, the address field 56 corresponding to the sub-subnetworks can include ten address subfields.

When the communication protocol used is the IPv4 protocol, the network address includes 32 bits in all, or 4 bytes.

A network address 50 is fully configured when the various address fields 52, 54, 56 and 58 are filled in, as a function of the hierarchy level of the subnetwork to which the considered communicating element belongs.

However, the complete configuration of a network address 50 requires knowing the topology of the communication network, and, for a new communicating element to be connected as node of the network, knowing the addresses of the communicating elements with a hierarchy level higher than that of the considered communicating element in the hierarchical network so as to enter its network prefix.

In an installation phase of a home automation system, certain network equipment items 22, 24 are not connected to the backbone 20.

Before the connection of a network equipment item 22, 24 to the backbone 20, the communicating elements already connected to this network equipment item can communicate with one another in a communication mode called unconfigured. Communication in the unconfigured mode is done either between the communicating elements connected to a same physical link 26, or with communicating elements connected to a physical link 26 belonging to a subnetwork with a rank lower than that to which the considered communicating element belongs by using a communication of the multicast type.

When an unconfigured network portion is connected to the configured communication network 14, the invention proposes to implement a method for automatically configuring a network address making it possible to go from the unconfigured communication mode to the configured communication mode, in which any communicating element has a fully configured network address.

Figure 6:
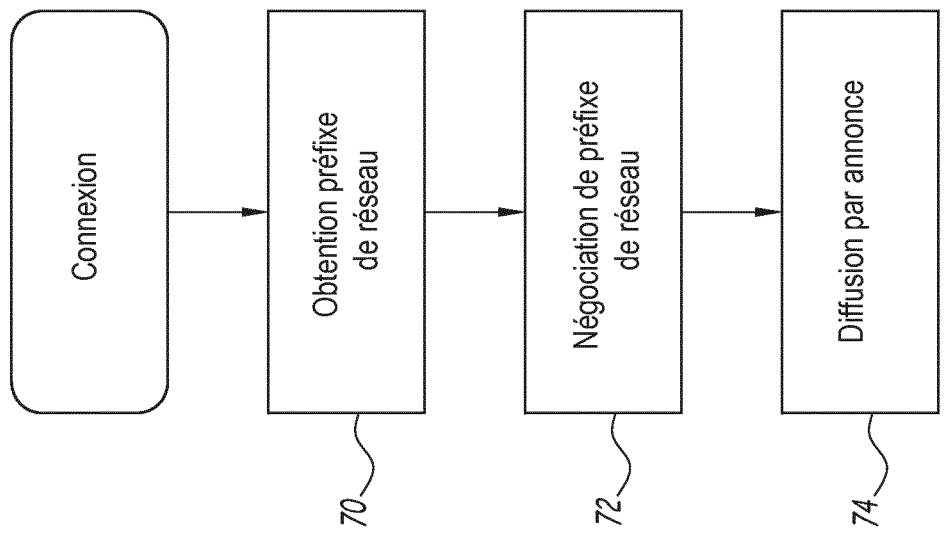
FIG. 6 is a block diagram of the main steps of a method for automatically configuring a network address carried out by an interconnection gateway according to one exemplary embodiment.

FIG. 6 is a flowchart of the main steps of a method for automatically configuring a network address 50 of network interfaces 40 of communicating elements 6, 8, 10, 22, 24 intended to belong to a home automation system 4 for a building 2. These communicating elements belong to an unconfigured communication network portion.

A communicating element is said to be "configured" when the address 50 of its network interface 40 is complete, that is to say, each of its address fields 52, 54, 56, 58 has been filled in.

It should be noted that depending on the hierarchy level of the subnetwork to which the communication element belongs, several address fields 54, 56 belonging to the network prefix of the network address of this communicating element can assume a nil value.

A communicating element is said to be "unconfigured" when at least one address field of the network address of its network interface 40 has not been filled in. In this state, the network interface 40 of the unconfigured communicating element is awaiting a message coming from a network equipment item to which it is connected to configure itself.

By analogy, a communication network 14 is said to be "configured" when each of the communicating elements connected to this communication network is configured. A configured subnetwork SN or a configured sub-subnetwork SSN can be defined similarly.

The unconfigured network portion can be intended to be a subnetwork SN and/or at least one sub-subnetwork SSN of the communication network on which it will be connected. The unconfigured network portion includes a network equipment item 22, 24 called head network equipment item and at least one communicating element 6, 8, 10, 22, 24. The so-called head network equipment item 22, 24 corresponds to the network equipment item by which the unconfigured network portion is connected to the already-configured communication network 14.

In one embodiment, the communication protocol used is the IPv6 protocol.

The configuration method is carried out automatically after the connection of the head network equipment item in the already-configured communication network 14. The head network equipment item can be a gateway 22 or router 24 depending on the nature of the network segment on which it connects.

The method primarily comprises steps for negotiating the network prefix associated with the network interface 40 of the head network equipment item 22, 24 and propagation of this network prefix to all of the communicating elements 6, 8, 10, 22, 24 belonging to the unconfigured network portion, in light of the automatic configuration of the network addresses 50 of all of their network interfaces 40.

Advantageously, the various successive steps for negotiating the network prefix and propagating negotiated network prefixes make it possible to configure the entire network portion automatically.

When the head network equipment item 22, 24 is connected to the communication network 14, the network controller 42 of the network interface of the head network equipment item carries out a step 72 for negotiating its network prefix. To that end, the network controller 42 begins by obtaining 70 the network prefix of the location where the head network equipment item connects in the network.

When the head network equipment item connects on the backbone 20, the network prefix limits itself to the site prefix GRP, the other address fields assuming the nil value. The network controller 42 queries a memory zone 44, 64 of the head equipment item 22, 24 in order to obtain this identifier prerecorded, for example, by an installer. Once obtained, the identifier GRP is assigned to the corresponding address field 52 in order to form the network address.

When the unconfigured network portion connects, via a head network equipment item, at a subnetwork SN, respectively a sub-subnetwork SSN, the network prefix includes the site prefix GRP and the subnet identifier SID, respectively the site prefix GRP, the subnet identifier and the sub subnet identifier SSID. As previously stated, a nil value is assigned to the other address fields. During such a connection, the network equipment items have a different procedure in order to obtain the network prefix, they wait for an advertisement of a network equipment item on one of their interfaces.

Next, the network controller 42 of a network interface providing the downlink of the head network equipment item carries out a step 72 for negotiating a subnet identifier SID or sub subnet identifier SSID. For example, the procedure implemented during this step for negotiating the network prefix is similar to the autoconfiguration procedure described in the document "IPv6 Stateless Address Configuration" (RFC4862).

During this negotiating step 72, the network controller 42 generates a subnet identifier SID or sub subnet identifier SSID. The identifier can be generated randomly or according to a predefined order. The network identifier implements mechanisms for verifying the uniqueness, in the communication network 14, of the network prefix formed with the identifier relative to the location where the unconfigured network portion connects in the network and with the identifier SID, SSID generated locally.

The uniqueness verification includes a request of the other network equipment items 60, of equal rank, of the communication network 14, thus making it possible to verify whether the generated subnet identifier SID or sub subnet identifier SSID has already been used by a network equipment item 60 of the same hierarchical level whose address has previously been configured.

If the uniqueness verification is negative, another subnet identifier SID or sub subnet identifier SSID is generated locally, and a new verification of the uniqueness of the generated identifier is carried out until obtaining a subnet identifier SID or sub subnet identifier SSID available in the communication network 14, that is to say, an identifier that is not already used by another network equipment item 22, 24 of equal rank.

The network controller 42 saves, in a memory of the network interface, its subnet identifier SID or sub subnet identifier SSID at the end of the implementation of the step 72 for negotiating the identifier. The address fields 54, 56 corresponding to the obtained identifier and the generated identifier of the network prefix of the network interface of the head equipment item are thus completed. These identifiers SID, SSID are associated with the interface identifier IID of the network interface 40 in order to form its complete network address 50, which can be saved in a memory of the network interface.

Steps 70 to 72 previously cited make it possible to assign a configured network prefix to the network interface of the head network equipment item of the unconfigured network portion.

These steps are followed by an advertisement step 74. During this step, the network controller 42 of the head equipment item transmits the network prefix that was assigned to its network interface 40 to the communicating elements directly connected to the head equipment item.

Communicating element directly connected to a first network equipment item refers to any communicating element 6, 8, 10, 22, 24 belonging to the physical link 26 connected to the first network equipment item. When the communicating element is a network equipment item, it involves a network equipment item of directly lower rank, that is to say, a hierarchy level equal to that of the first network equipment item minus one unit.

In particular, the network prefix used by the head equipment item 22, 24 is sent to the network equipment items of directly lower rank. The advertisement mechanism is carried out by a router advertisement (router advertisement RFC4861).

The advertisement is done repeatedly or in response to a solicitation (router solicitation).

According to one embodiment, the network equipment items of type RS485 can send an unsolicited advertisement with a doubled period upon each advertisement, the initial period being 4 seconds and the maximum period being 32768 seconds.

Furthermore, after the configuration of its network address, the network interface 40 of the head network equipment item must respond to each solicitation received from another communicating equipment item of the communication network 14, to allow the automatic configuration of the address of the network interface of this other communicating element.

Figure 7:
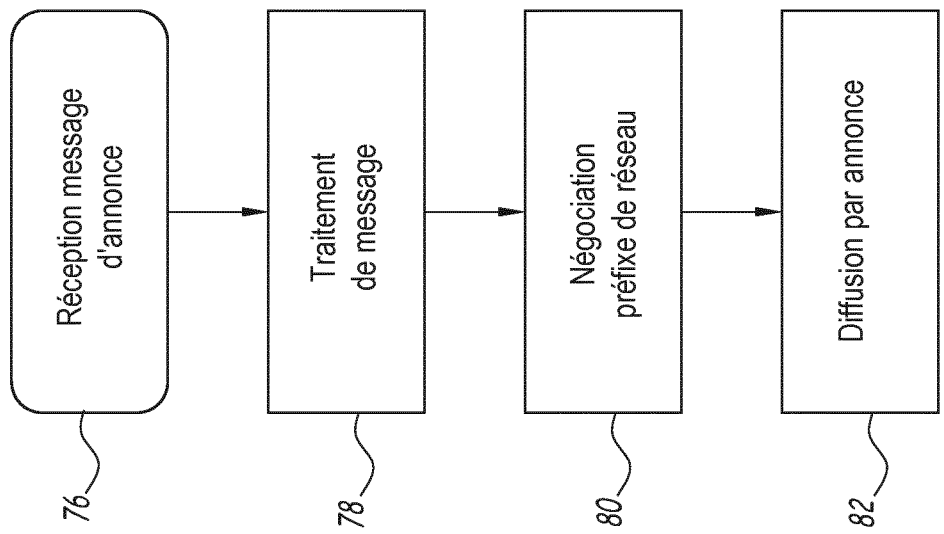
FIG. 7 is a block diagram of the main steps of a method for automatically configuring a network address carried out by a router according to one embodiment.

The advertisement message is received by each network equipment item 22, 24 connected to the physical link 26 coupled to the network interface having emitted the advertisement. Upon receiving an advertisement message, the network controller 42 of each network equipment item 22, 24 carries out steps 76 to 82 described hereinafter in reference to FIG. 7.

More generally, each network equipment item 22, 24, head of a subnetwork, or of a sub-subnetwork, with rank "n–k", k being a non-nil imager, receives an advertisement message advertising the network prefix of the network equipment item 22, 24 with rank "n–k+1", which is the rank immediately higher than its own, having just configured itself and to which it is directly connected.

The steps referenced 76 to 82 are carried out by a network equipment item in order to configure the network prefix of its network interfaces of lower rank and to propagate it to the communicating elements 6, 8, 10, 22, 24 that are directly connected to it.

In an unconfigured network portion, a network equipment item, head of a subnetwork, refers to the network equipment item to which the subnetwork in question is connected. A network equipment item, head of a sub-subnetwork, is defined similarly.

During a step 76 for receiving an advertisement message, a network equipment item with rank "n–k", k being a non-nil imager, called downstream network equipment item, receives an advertisement message of a network prefix of a network equipment item with rank "n–k+1", called upstream network equipment item.

The reception step 76 is followed by a step 78 for processing the received message, in particular including the extraction of the received network prefix, here called upstream network prefix. According to one embodiment, the network controller 42 can compare the received network prefix with a default network prefix previously stored in a memory of the network interface of the network equipment item.

The network prefix received by the network interface is recognized as upstream network prefix, coming from a network equipment item of higher rank than that of the considered network equipment item, in the hierarchical network. Likewise, the network interface 40 on which this network prefix has been received is recognized as being the network interface 40 providing the uplink connection.

During step 78 for processing the received message, the network controller 42 determines which address subfields 56a to 56j among the address fields it will have to negotiate to identify the networks of lower rank that it will administer. This involves the first address subfield 56a to 56j that is filled in with a nil value in the uplink network prefix.

Step 78 for processing the received message is followed by a step 80 for negotiating a sub-subnetwork identifier SSID, similar to the step for negotiating an identifier 72 described above, and which is intended to obtain a sub-subnetwork identifier available in the communication network 14.

Once the uniqueness of the sub-subnetwork identifier SSID is verified, the network controller 42 completes the network prefix of its network interface by adding the generated subnetwork identifier SSID. The network controller also forms the network address 50 of its network interface by adding, to the network prefix, the interface identifier IID that has been assigned to it. The complete network address 50 is next saved in a memory 44, 64 of the network interface 40.

The network prefix of the network interface of the configured network equipment item is next transmitted by advertisement, during the advertisement step 82, to the directly connected communicating elements.

Thus, when the unconfigured network portion includes several hierarchy levels, the network interface of a network equipment item 22, 24, head of a sub-subnetwork SSN with rank "n−1", advertises its network address to the network equipment items with rank "n−2", each of these network equipment items of lower rank next carrying out steps 76 to 82 described above.

As a result, the configuration of the network addresses is done in a cascade, by descending propagation in the hierarchy levels of the network.

Figure 8:
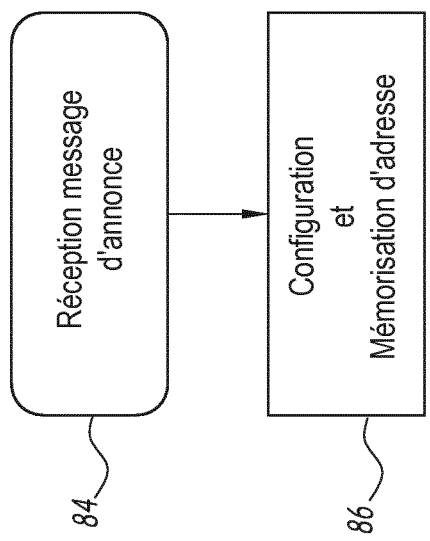
FIG. 8 is a block diagram of the main steps of a method for automatically configuring a network address carried out by a home automation equipment item according to one embodiment.

Each communicating element corresponding to a home automation equipment item 6, 8, 10 also carries out steps to configure the network address of its network interface, as explained below in reference to FIG. 8.

The network interface 40 of each equipment item 6, 8, 10 receives an advertising message emitted by the head equipment item of the local subnetwork SN or sub-subnetwork SSN to which it belongs during a step 84.

During a processing step 86, the network controller 42 of the considered home automation equipment item extracts, from the received message, the network prefix of the network interface of the network equipment item, including the values to be assigned to the address fields 52, 54, 56 and forms its complete network address 50, adding its identifier IID.

Thus, after the connection of the head network equipment item of an unconfigured network portion, all of the network addresses of all of the communicating elements connected in this unconfigured network portion are configured from one to the next, in decreasing order of successive hierarchy levels, which makes it possible to perform communications according to the predetermined communication protocol, in configured mode.

Advantageously, owing to the hierarchical form of the communication network 14 and the particular form of the network address 50 of each communicating element, each network equipment item in the process of being configured knows which address field or subfield it must negotiate and where it is in the configuration of the network portion to be configured. This is in particular due to the structure of the address field 56 corresponding to the identifier SSID of the sub-subnetwork SSN, which is divided into a plurality of address subfields 56a to 56j corresponding to the topology of the sub-subnetwork SSN of the communication network 14.

The invention claimed is:

1. A method for automatically configuring network addresses of network interfaces of at least one communicating element intended to form part of a home automation system for a building and belonging to an unconfigured network part,
   the unconfigured network part including a head network equipment item and at least one communicating element connected on a same physical link and adapted to communicate directly via said physical link,
   the network address of each of the network interfaces including a network prefix,
   the method being implemented subsequent to connection of the head network equipment item to a configured communication network belonging to the home automation system for a building, the communication network being arranged in the form of a hierarchical network including at least two successive hierarchy levels,
   the method comprising the steps of:
   negotiating a first network prefix of a network interface of the at least one communicating element of the head network equipment item,
   propagating the negotiated first network prefix of the network interface of the head network equipment item to the at least one communicating element belonging to the unconfigured network part by direct communication over said physical link between the head network equipment item and the at least one communicating element, and automatically configuring the network addresses of the network interfaces of said at least one communicating element, by each said communicating element of the unconfigured network part using the negotiated first network prefix of the network interface of the head network equipment item,
   said propagating being carried out by successive hierarchy levels, in descending order, by each configured communicating element which is a network equipment item belonging to a hierarchy level of a given rank to at least one communicating element directly connected on the same physical link and belonging to a hierarchy level of directly lower rank.

2. The method according to claim 1, wherein the network address of each network interface includes a plurality of address fields, each of the address fields of the network address of a network interface relating to at least one hierarchy level of the communication network, and the negotiating step comprises the steps of:
   generating a first identifier,
   forming a network prefix by assigning the first identifier to a first address field of the network address,
   verifying uniqueness, in the configured communication network, of said network prefix formed with the first generated identifier,
   and in case of negative verification, repeating the steps for generating a first identifier, forming a network prefix and verifying uniqueness of the network prefix.

3. The method according to claim 2, wherein the communication network includes a main network, the head network equipment item being connected to the main network, the negotiating step comprises a step for obtaining a second identifier associated with the main network and assigning the second identifier to a second address field of the network address.

4. The method according to claim 2, wherein the communication network includes a main network and at least one subnetwork connected to the main network by means of a network equipment item and wherein the head network equipment item is connected to said subnetwork, and
   wherein the negotiating step comprises a step for obtaining a second identifier associated with the subnetwork and assigning the second identifier to a second address field of the network address.

5. The method according to claim 2, wherein the communication network includes a main network, at least one subnetwork connected to the main network by means of a first network equipment item and at least one sub-subnetwork connected to the subnetwork by means of a second network equipment item, and wherein the head network equipment item is connected to one said sub-subnetwork, and
   wherein the negotiating step comprises a step for obtaining a second identifier associated with the sub-subnetwork and assigning the second identifier to a second addressing field of the network address.

6. The method according to claim 1, wherein an interface identifier has been assigned to the network interface of the head network equipment item, and wherein the automatic network address configuration method of the head network equipment item further comprises a step for assigning the interface identifier of the network interface of the head equipment item to a third address field of the network address.

7. The method according to claim 1, wherein said propagating step comprises the sending, by the network interface of the head network equipment item and to at least one first network equipment item directly connected to the head network equipment item, of the first network prefix of the network address of the network interface of the head network equipment item, and the method including steps for:
negotiating a second network prefix of the network interface of the first network equipment item from the first network prefix received from the head network equipment item,
advertising the second network prefix of the network interface of the first network equipment item, to all the communicating element or elements directly connected to the first network equipment item,
when the recipient communicating element is a network equipment item, the steps for negotiating and advertising are repeated in a cascade for each network equipment item of successive hierarchy level, in a descending order.

8. The method according to claim 7, wherein the network prefix of the network interface of the head network equipment item is transmitted in a broadcast message, and the negotiation of a network prefix of the network interface of the first network equipment item comprises steps for:
receiving the network prefix of the head network equipment item by the network interface of the first network equipment item,
generating the network prefix of the network interface of the first network equipment item from the received network prefix.

9. The method according to claim 8, wherein the step for negotiating the network prefix further comprises steps for:
generating an identifier associated with a sub-subnetwork,
verifying the uniqueness, in the communication network, of the network prefix formed with the received network prefix and the generated identifier,
in case of negative verification, the identifier generating and verification steps being repeated.

10. The method according to claim 1, wherein the propagation step of the network prefix comprises the emission of a broadcast message by the network interface of the network equipment item to at least one home automation equipment item directly connected to the network equipment item, an interface identifier having been assigned to the network interface of the home automation equipment item, the broadcast message including the network prefix of the head network equipment item, the method comprising steps for:
reception of the network prefix by the network interface of the home automation equipment item,
extraction of address fields of the network prefix,
assignment of a network address to the network interface of the home automation equipment item from extracted address fields and the interface identifier of the home automation equipment item.

11. A network interface for a communicating element belonging to a home automation system for a building, the network interface comprising:
a network controller configured to carry out a method for automatically configuring network addresses of network interfaces of at least one communicating element intended to form part of the home automation system for a building and belonging to an unconfigured network part,
the unconfigured network part including a head network equipment item and at least one communicating element connected on a same physical link and adapted to communicate directly via said physical link,
the network address of each of the network interfaces including a network prefix,
the method being implemented by the network controller subsequent to connection of the head network equipment item to a configured communication network belonging to the home automation system for a building, the communication network being arranged in the form of a hierarchical network including at least two successive hierarchy levels, and including:
negotiating a first network prefix of a network interface of the at least one communicating element of the head network equipment item,
propagating the negotiated first network prefix of the network interface of the head network equipment item to the at least one communicating element belonging to the unconfigured network part by direct communication over said physical link between the head network equipment item and the at least one communicating element, and automatically configuring the network addresses of the network interfaces of said at least one communicating element, by each said other communicating element of the unconfigured network part using the negotiated first network prefix of the network interface of the head network equipment item,
said propagating being carried out by successive hierarchy levels, in descending order, by each configured communicating element which is a network equipment item belonging to a hierarchy level of a given rank to at least one communicating element directly connected on the same physical link and belonging to a hierarchy level of directly lower rank.

12. The network interface according to claim 11 further comprising a memory configured to save the network address of the network interface, wherein the network address is divided into a plurality of address fields, each address field corresponding to different and successive hierarchy levels of the communication network.

13. The network interface according to claim 12, wherein the network address includes an address field corresponding to a sub-subnetwork identifier of the communication network, divided into a plurality of address subfields, each address subfields corresponding to different and successive hierarchy levels of said subnetwork.

14. A communicating element belonging to a home automation system for a building, comprising a network interface according to claim 12.

15. A home automation system for a building, wherein the system includes a communication network arranged in the form of a hierarchical network and a plurality of communicating equipment items according to claim 14, connected to the communication network.

16. A communicating element belonging to a home automation system for a building, comprising a network interface according to claim 13.

17. A home automation system for a building, wherein the system includes a communication network arranged in the form of a hierarchical network and a plurality of communicating equipment items according to claim 16, connected to the communication network.

18. The method according to claim 1 wherein the physical link is a multipoint serial data bus.

19. A method for automatically configuring network addresses of network interfaces of at least one communicating element intended to form part of a home automation system for a building and belonging to an unconfigured network part,
the unconfigured network part including a head network equipment item and at least one communicating element connected on a same physical link and adapted to communicate directly via said physical link,
the network address of each of the network interfaces including a network prefix and a field divided into a plurality of address subfields,
the method being implemented subsequent to connection of the head network equipment item to a configured communication network belonging to the home automation system for a building, the communication network being arranged in the form of a hierarchical network including at least two successive hierarchy levels,
the method comprising the steps of:
negotiating a first network prefix of a network interface of the at least one communicating element of the head network equipment item,
propagating the negotiated first network prefix of the network interface of the head network equipment item to the at least one communicating element belonging to the unconfigured network part by direct communication over said physical link between the head network equipment item and the at least one communicating element,
and automatically configuring the network addresses of the network interfaces of said at least one communicating element, by each communicating element of the unconfigured network part using the negotiated first network prefix of the network interface of the head network equipment item,
wherein said propagating is done by hierarchy levels and comprises the sending of the first network prefix by the network interface of the head network equipment item, to at least one first network equipment item directly connected on said physical link to the head network equipment item, and
the network controller of the first network equipment determines, from the first network prefix received, which address subfield to negotiate to identify a subnetwork, of lower hierarchy level, of communicating elements directly connected to the first network equipment.

20. The method of claim 19 further comprising
negotiating a second network prefix of the network interface of the first network equipment item from the first network prefix received from the head network equipment item, the negotiating comprising obtaining a unique subnetwork identifier and writing the subnetwork identifier to the determined address subfield,
advertising the second network prefix of the network interface of the first network equipment item, to all the communicating element or elements directly connected to the first network equipment item,
when the recipient communicating element is a network equipment item, the steps for negotiating and advertising are repeated in a cascade for each network equipment item of successive hierarchy level, in descending order.

21. The method of claim 19, wherein determining which address subfields of the address fields to negotiate to identify at least one subnetwork comprises determining a first address subfield filled with a nil value in the first network prefix.

* * * * *